(12) United States Patent
Mehra et al.

(10) Patent No.: US 11,899,546 B2
(45) Date of Patent: Feb. 13, 2024

(54) PORTABILITY OF CHECKPOINTS OF AN APPLICATION USING CENTRAL PROCESSING UNIT (CPU)-SPECIFIC FUNCTIONS

(71) Applicant: Red Hat, Inc., Raleigh, NC (US)

(72) Inventors: Ashutosh Mehra, Toronto (CA); Daniel Heidinga, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 76 days.

(21) Appl. No.: 17/804,230

(22) Filed: May 26, 2022

(65) Prior Publication Data
US 2023/0385162 A1 Nov. 30, 2023

(51) Int. Cl.
*G06F 11/10* (2006.01)
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,154,877 A | 11/2000 | Ramkumar et al. | |
| 6,256,751 B1 | 7/2001 | Meth et al. | |
| 6,795,966 B1 | 9/2004 | Lim et al. | |
| 7,793,153 B2 | 9/2010 | Subhraveti | |
| 9,740,562 B2 | 8/2017 | Leibman et al. | |
| 2003/0088807 A1 | 5/2003 | Mathiske et al. | |
| 2021/0184934 A1* | 6/2021 | Day | H04L 47/12 |
| 2022/0131556 A1* | 4/2022 | Teixeira De Abreu Pinho | G06F 18/214 |

OTHER PUBLICATIONS

Widjajarto, et al.; "Live migration using checkpoint and restore in userspace (CRIU): Usage analysis of network, memory and CPU"; Bulletin of Electrical Engineering and Informatics; vol. 10, No. 2.; Apr. 2021; (11 pages).

* cited by examiner

*Primary Examiner* — Jau Shya Meng
(74) *Attorney, Agent, or Firm* — K&L Gates LLP

(57) ABSTRACT

Systems and methods are described for improving portability of checkpoints of an application using central processing unit (CPU)-specific features. In an example, a system includes a source computing system and a destination computing system. The source computing system may be configured to: cause a first execution of an application that includes a function associated with a plurality of implementations; receive a request to resolve an implementation decision for the function; select, based on a set of source CPU-specific features, a source-specific implementation for the first execution of the function; patch, by rendering a resolved callsite table, a call site associated with the function with an address of the source-specific implementation; and send, to a destination computing system, a checkpoint of the application that includes the resolved callsite table. The destination computing system is configured to restore the application by changing the implementation decision based on a set of destination CPU-specific features.

20 Claims, 6 Drawing Sheets

PORTABILITY OF CHECKPOINTS OF AN APPLICATION USING CENTRAL PROCESSING UNIT (CPU)-SPECIFIC FUNCTIONS

BACKGROUND

Checkpoint Restore In Userspace (CRIU) is a tool to checkpoint and restore an application, program, container, and/or process on Linux. CRIU allows a user to snapshot the current runtime state of the application, program, container, and/or process onto a disk. The snapshot, referred to herein as checkpoint, can then later be used to restore the process to the same state when the snapshot was taken.

Thus, tools such as CRIU can be used to migrate an application, program, container, and/or process from one computer system to another computer system and also to facilitate a quick launch of applications, programs, container, and/or processes that can suffer from slow startup. Furthermore, such tools invariably involve checkpointing an application, program, container, and/or process on a computing system at a source device (source system) and restoring the application, program, container, and/or process on a computing system of a destination device (destination system). The application, program, container, and/or process being restored may use functions (e.g., as part of its source code or libraries) that can have multiple implementations. Each implementation may rely on one or more features of a central processing unit (CPU) of a computing system (CPU-specific features). A set of CPU-specific features relied on by one implementation of a function may be different from that relied on by another implementation of the function. Furthermore, the CPU of the destination system need not provide the same set of CPU-specific features as the CPU of the source system.

SUMMARY

The present disclosure provides new and innovative systems and methods for improving portability of checkpoints of an application using central processing unit (CPU)-specific functions. In an example, a method includes: initiating, by a computing system (e.g., a destination computing system), a restoration of an application previously running on a source computing system, wherein the application includes a function; identifying, by the computing system, based on the function, a plurality of implementations associated with the function; rendering, as unresolved, an implementation decision of the function, wherein the implementation decision is associated with selecting an implementation among the plurality of implementations; determining, by the computing system, based on a query of a central processing unit associated with the computing system, a destination set of CPU-specific features associated with the computing system; and selecting, based on the set of destination CPU-specific features, a destination-specific implementation of the plurality of implementations for the function.

Another method may include: receiving, by a computing system (e.g., a source computing system), a request to resolve a function during a first execution of the function, wherein the function is associated with a plurality of implementations; determining based on a query of a central processing unit (CPU) associated with the computing system, a set of source CPU-specific features associated with the computing system; selecting, based on the set of source CPU-specific features, a source-specific implementation of the plurality of implementations the function; patching a callsite associated with the function (e.g., by rendering a resolved callsite table) with an address of the source-specific implementation; and causing, based on a set of destination CPU-specific features associated with a destination computing system, a re-resolution of the function during a restoration of a checkpoint of the application on the destination computing system.

In an example, a system includes a source computing system comprising a source memory, and a source processor. When the instructions are executed by the source processor, the instructions cause the source computing system to: cause a first execution of an application, wherein the application includes a function associated with a plurality of implementations; receive a request to resolve an implementation decision for the function during the first execution, wherein resolving the implementation decision comprises selecting an implementation among the plurality of implementations; determine, based on a query of a central processing unit (CPU) associated with the source computing system, a set of source CPU-specific features associated with the source computing system; select, based on the set of source CPU-specific features, a source-specific implementation of the plurality of implementations for the first execution of the function; patch, by rendering a resolved callsite table, a call site associated with the function with an address of the source-specific implementation; send, to a destination computing system, a checkpoint of the application, wherein the checkpoint includes the resolved callsite table; and cause, during a restoration of the application, based on a set of destination CPU-specific features associated with the destination computing system, the destination computing system to change the implementation decision.

In some embodiments, the system further includes the destination computing system comprising a destination memory, and a destination processor. The destination memory stores instructions that, when executed by the destination processor, causes the destination computing system to: initiate a restoration of the application; identify, by tracing the address of the call site associated with the function, the plurality of implementations associated with the function; render, as unresolved, the implementation decision for the function; determine based on a query of a central processing unit (CPU) associated with the destination computing system, the set of destination CPU-specific features associated with the destination computing system; and select, based on the set of destination CPU-specific features, a destination-specific implementation of the plurality of implementations for a second execution of the restored application.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
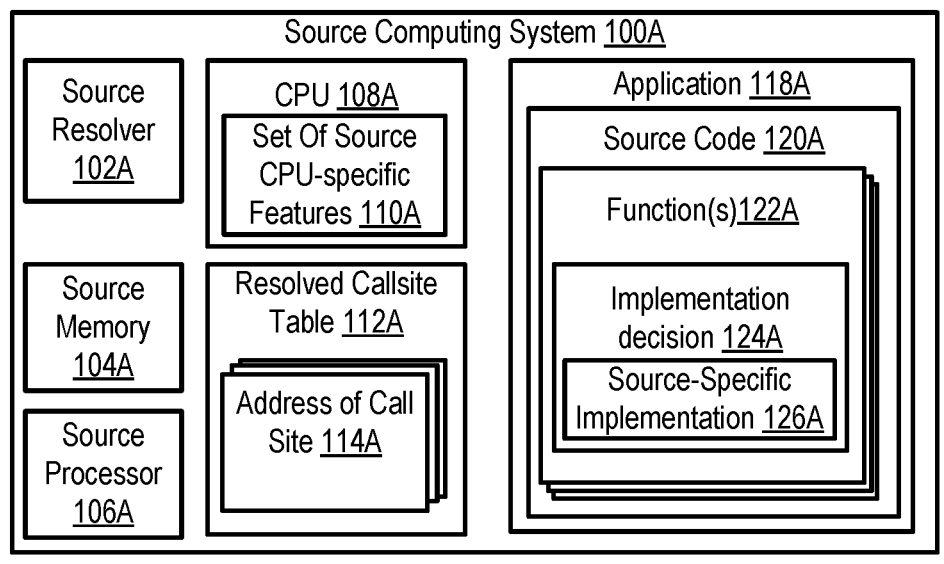
FIG. 1 is a block diagram of an example computer network environment for improving portability of checkpoints of an application using central processing unit (CPU)-specific functions, according to an example embodiment of the present disclosure.
Figure 1:
Figure 1:
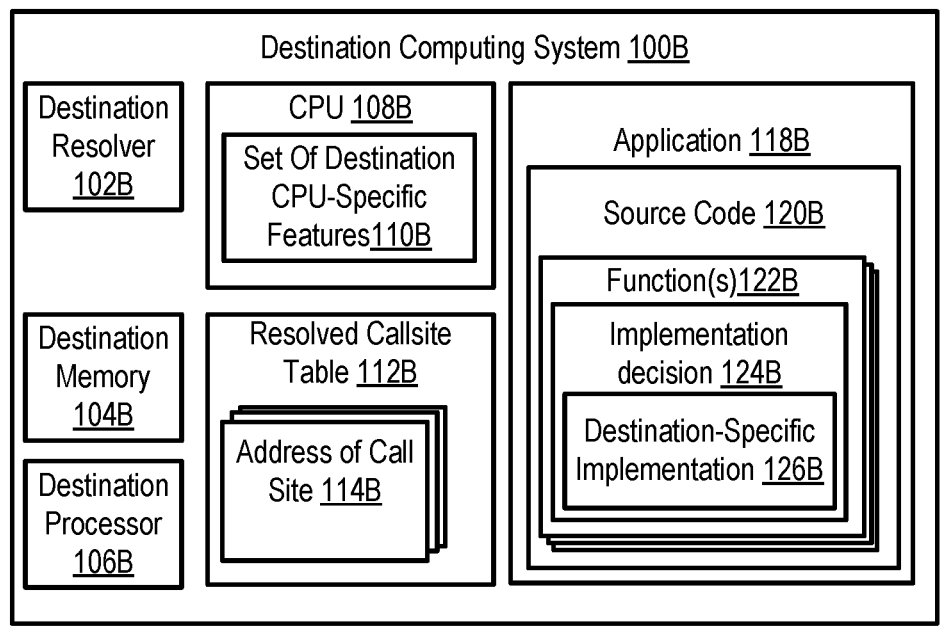

Checkpoint restore tools (e.g., CRIU) can be used to migrate an application, program, container, and/or process from one computer system to another computer system. The application, program, container, and/or process being restored may use functions (e.g., as part of its source code or libraries) that can have multiple implementations, with each implementation requiring a different set of features from a central processing unit (CPU). However, the CPU of the destination system need not provide the same set of CPU-specific features as the CPU of the source system. For example, an application makes use of a function foo( ) from a library that can have multiple implementations for foo( ). When the application is running in a computing system (e.g., the source system), the call to foo( ) may be linked to, and cause the execution of, a particular implementation of foo( ) based on the CPU-specific features of the computing system (e.g., the source system). If a checkpoint for the application is taken after this linkage has been established, then restoring the application in another computing system (a destination system) from the checkpoint can prove fatal if the new computing system (the destination system) does not have the CPU-specific features being used by the function implementation. There is thus a desire and need for a system and method that can allow applications, programs, containers, and/or processes to seamlessly migrate from one computing system to another computing system having dissimilar CPU-specific features. Moreover there is a desire and need for a system and method that can leverage checkpoint and restore tools to improve portability of the applications, programs, containers, and/or processes, e.g., such that they adapt to the different computing systems.

Various embodiments of the present disclosure address one or more of the above described shortcomings. Systems and methods for improving portability of checkpoints of an application using central processing unit (CPU)-specific functions is disclosed that involves resolving function (e.g., of an application, program, container, and/or process) having multiple implementations. In at least one embodiment, the presently disclosed systems and methods may involve preventing execution of an implementation of a function on a destination system, where the implementation (source-specific implementation) is based on CPU-specific features of a source system, but where the source-specific implementation may not necessarily be compatible with the CPU-specific features of the destination system. Instead the system and method involves causing execution of another implementation (a destination-specific implementation) of the function on the destination system, where the destination-specific implementation is compatible with the CPU-specific features of the destination system.

On the first invocation of the function (e.g., at the source system) the control may pass to the resolver along with one or more parameters identifying the function to be resolved. The resolver, based on CPU-specific features provided by the operating system (e.g., source system), may select an implementation to use that is compatible with the CPU-specific features. The resolver may then patch the callsite with the address of the selected implementation. On subsequent invocations of the function, the control directly jumps to the address of the selected implementation provided by the resolver.

As previously described, the application that includes the function may be migrated to another computing system (destination system) via a checkpoint process, where a snapshot of the application is taken at run-time and that snapshot is provided to the destination system to allow the destination system to restore the application. However, as the function was resolved based on an implementation that was compatible specifically for the CPU-specific features provided by the source system, and since the destination system may provide a different set of CPU-specific features, the function may not necessarily be compatible on the destination system and may cause the destination system to crash. A re-resolution (e.g., based on a different implementation) may be necessary. Systems and methods disclosed herein involve identifying, within an application to be restored on a destination system, one or more functions that have multiple implementations, and marking such functions as unresolved during the restore process. This marking would cause a re-resolution of the function on the next invocation. A resolver (e.g., at the destination system) may then use the destination system's CPU-specific features to choose an implementation that is specifically compatible to the destination system's CPU-specific features.

FIG. 1 is a block diagram of an example computer network environment 100 for improving portability of checkpoints of an application using central processing unit (CPU)-specific functions, according to an example embodiment of the present disclosure. The example computer network environment 100 may be a system comprising multiple systems or subsystems. As shown in FIG. 1, the computer network environment may comprise a source computing system 100A and a destination computing system 100B. As will be explained further herein, the source computing system 100A may function as the source of a checkpoint 130A generated for an application that is migrated to another computing system, which in the example shown is the destination computing system 100B. Although source and destination are used in the names of computing systems 100A and 100B (and in the names of their respective components), respectively, it is contemplated and/or expected that, in some embodiments, the destination computing system 100B may serve as a source for a further migration of the application to yet another computing system. Likewise it is contemplated and/or expected that, in some embodiments, the source computing system 100A may serve as a destination for a migration of the application from yet another computing system.

The source computing system 100A may include a resolver (source resolver 102A, a memory (e.g., source memory 104A), a processor (e.g., source processor 106A), a central processing unit (CPU) 108A, a resolved callsite table 112A, and an application 118A. The destination computing system 100B may include similar corresponding components 102B-126B, as will be discussed herein.

The source memory 104A of the source computing system 100A may store instructions that, when executed by the source processor, causes the source computing system to perform one or more steps or processes described herein. For example, the instructions may cause a first execution of the application 118A. The application 118A (e.g., a software, program, container, and/or process) may include one or more functions 122A. For example, a function 122A may be associated with a plurality of implementations, including e.g., an implementation that is particularly suited for the source computing system 100A (a source-specific implementation 126A) and an implementation that is particularly suited for the destination computing system (a destination-specific implementation 126B). The instructions, when executed, may cause the source processor 106A to receive a request to resolve an implementation decision 124A for the function 122A during the first execution. Resolving the implementation decision 124A may comprise selecting an implementation among the plurality of implementations. The source computing system 100A may determine, based on a query of the central processing unit 108A associated with the source computing system 100A, a set of source CPU-specific features 110A associated (e.g., uniquely) with the source computing system 100A (e.g., via its CPU 108A). It is to be appreciated that each computing system (e.g., source computing system 100A and destination computing system 100B) may have a unique set of features for their CPU's such that the sets of features need not be the same. Based on the set of source CPU-specific features 110A, a source-specific implementation 126A of the plurality of implementations may be selected for the first execution of the function 122A. The execution of the application at the source computing system 100A may be referred to as the first execution in order to distinguish from a subsequent execution at the destination computing system 100B, as will be discussed herein.

The resolved callsite table 112A may store an address of a resolved call site 114A associated with the function 122A. In some aspects, other addresses of call sites corresponding to other functions can be stored at the resolved callsite 112A. A resolved callsite may, via addresses of the selected implementations of one or more functions of an application, indicate that the one or more function of the application are resolved.

The source computing system 100A may be further configured to send, to the destination computing system 100B, a checkpoint 130 of the application 118A. The checkpoint 130A may comprise a snapshot of the runtime of the application 118 to allow another computing system (e.g., the destination computing system 100B) to restore the application 118A. The checkpoint 130 may include or provide access to the resolved callsite table 112A, which may indicate, for example, addresses of resolved call sites for functions associated with the application 118A. However, as previously discussed, computing systems may have CPUs with different sets of CPU-specific features. One implementation of a function, while compatible with one computing system's CPU, may not necessarily be compatible with another computing system's CPU. Thus the source computing system may cause, by sending the checkpoint 130, the destination computing system 100B to change the implementation decision 124A of the application 118A (e.g., during a restoration of the application 118B, based on a set of destination-specific features 110B associated with the destination computing system 100B).

As shown in FIG. 1, the computer network environment 100 may further comprise the destination computing system 100B having similar components performing similar functions as the source computing system 100A (e.g., destination resolver 102B, destination memory 104B, destination processor 106B, CPU 108B, resolved callsite table 112B, application 118B). The destination memory 104B may store instructions that, when executed by the destination processor 106B, may cause the destination computing system 100B to perform one or more steps or processes described herein. For example, the destination computing system 100B may be configured to initiate a restoration of the application (e.g., as application 118B).

As previously described, the application being restored (e.g., via checkpoint 130) may comprise source code 120B that includes one or more functions (e.g., function 122B). A function (e.g., function 122B) may have more than one implementation (e.g. the source-specific implementation 126A, destination-specific implantation 126B, etc.). An implementation decision, once resolved, may indicate which implementation is to be used. While the source computing system 100A rendered the implementation decision 124A as resolved, on the basis of using the source-specific implementation 126A, the destination computing system may not necessarily be able to run the source-specific implementation because the CPU 108B may not necessarily share the same set of CPU-specific features as the source computing system 100A for the source-specific implementation 126A to be compatible. In order to safeguard against any system crash or failure caused by running an incompatible implementation of the application, the destination computing system 100B may be configured to render, as unresolved, the implementation decision 124B for the function 122B. Thus, the destination computing system 100B may thus query its CPU 108B to identify the set of CPU-specific features associated with the destination computing system 100B (e.g., set of destination CPU-specific features 110B). Based on the set of destination CPU-specific features, the destination computing system 100B may select a destination-specific implementation 126B of the plurality of implementations for a second execution of the restored application 118B.

Figure 2:
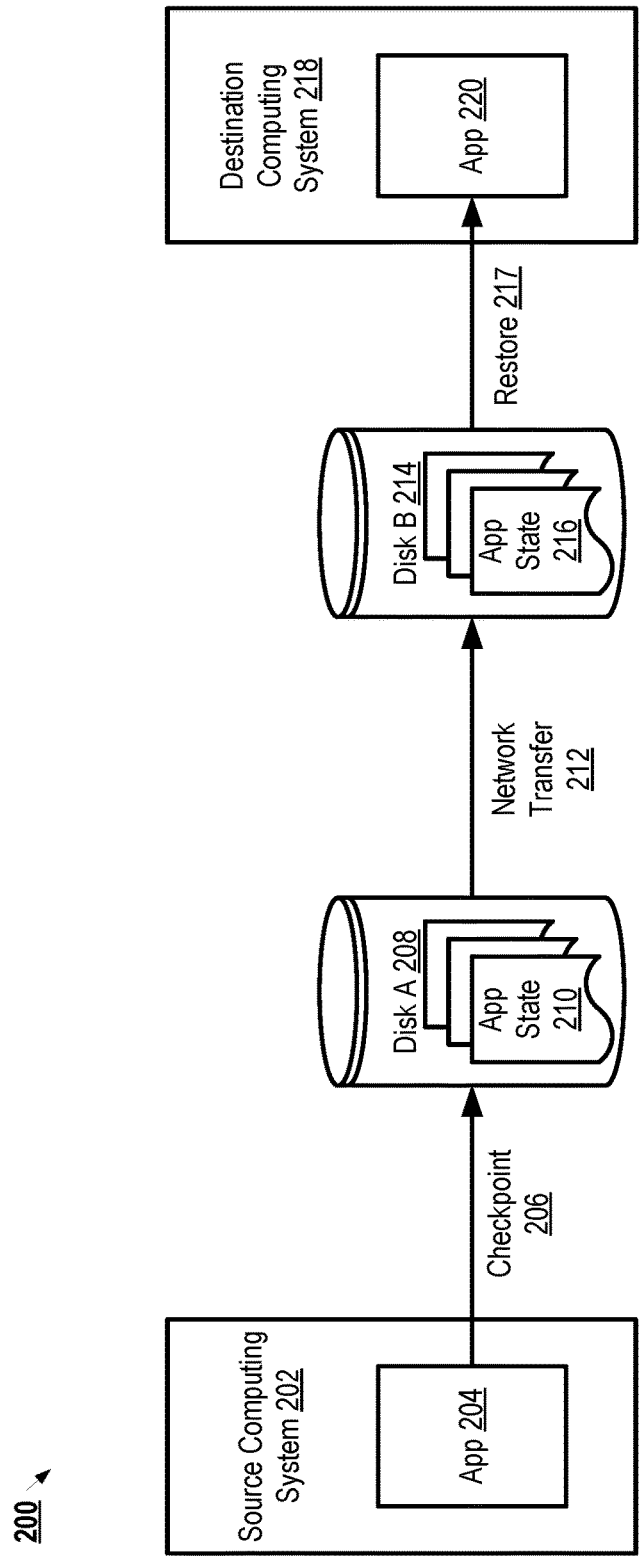
FIG. 2 is a block diagram showing an example process for improving portability of checkpoints of an application using central processing unit (CPU)-specific functions, according to an example embodiment of the present disclosure.

FIG. 2 is a block diagram showing an example process 200 for improving portability of checkpoints of an application using central processing unit (CPU)-specific functions, according to an example embodiment of the present disclosure. As shown in FIG. 2, process 200 involves a source computing system 202 running an application 204, and using an associated electronic storage medium (e.g., Disk A 208) to capture a runtime state of the application (e.g., app state 210). The runtime state providing a snapshot of the application may be referred to as the checkpoint 206, and may be used in the restoration process 217 by the destination computing system 218. Process 200 further involves the destination computing system 218 restoring the application (e.g., application 220) using an associated electronic storage medium (e.g., Disk B 214) that receives and stores the runtime state of the application (e.g., app state 216) via a network transfer 212. For example, process 200 may include the source computing system 202 generating a checkpoint 206 of the application 204 and writing the process image (e.g., app state 210) to disk A 210, transferring the application's checkpoint 206 to disk B 214 (e.g., via network transfer 212), and then resuming the application 220 on the destination computing system 218 by restoring it (e.g., as shown by restoring process 217) from the checkpoint (e.g. app state 216) received and stored in disk B 214. In some embodiments, the source computing system 202 of FIG. 2 may comprise, or share the components and/or functions as, the source computing system 100A of FIG. 1 and either may be referred to as the source computing system 100A/202 for simplicity. Furthermore, the destination computing system 218 of FIG. 2 may comprise, or share the components and/or functions as, the destination computing system 100B of FIG. 1 and either may be referred to as the destination computing system 100B/218 for simplicity.

Figure 3:
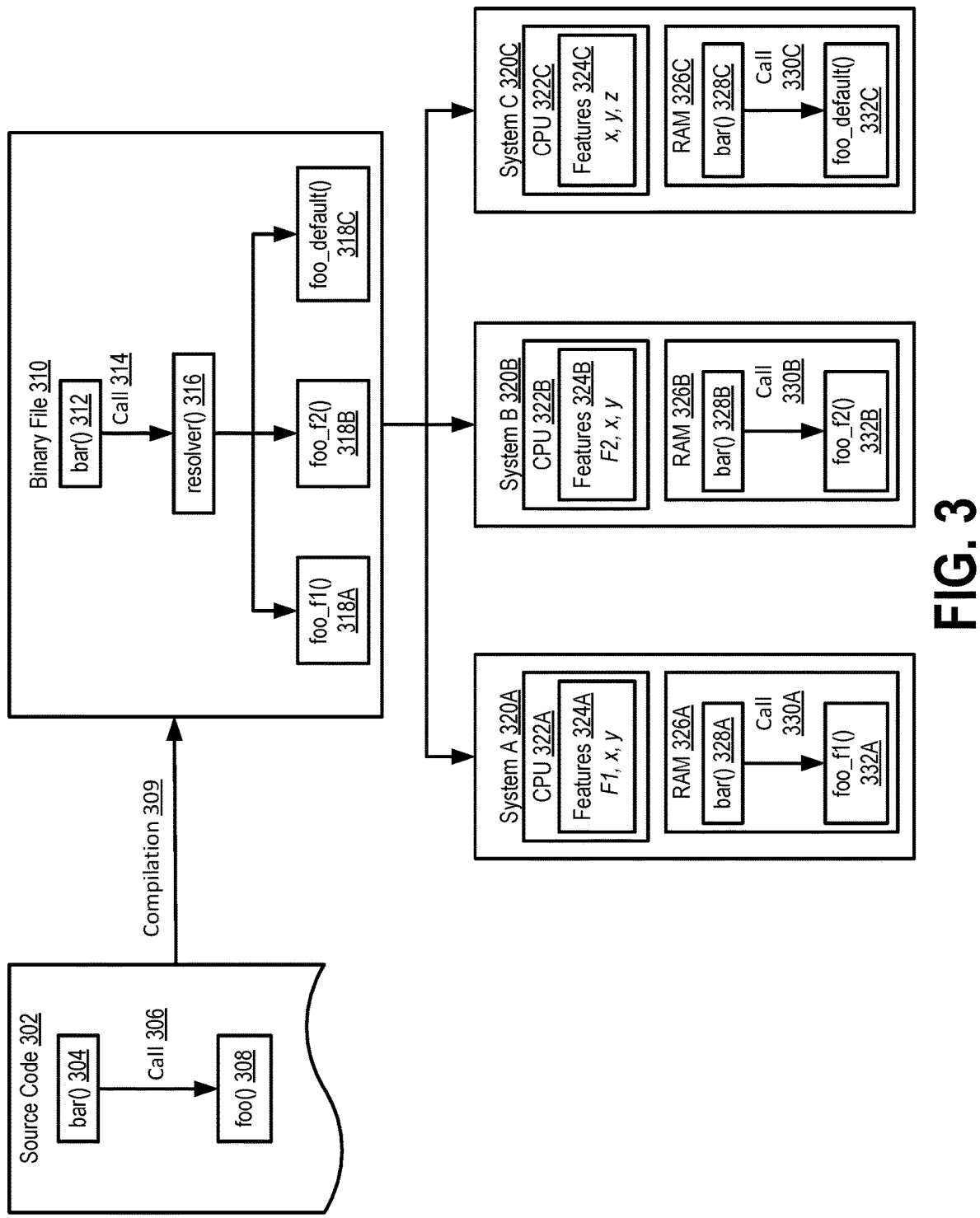
FIG. 3 is a block diagram illustrating different implementations of a function of an application for improving portability of checkpoints of the application in different computing systems, according to an example embodiment of the present disclosure.

FIG. 3 is a block diagram illustrating different implementations of a function of an application for improving portability of checkpoints of the application in different computing systems, according to an example embodiment of the present disclosure. The application may be based on a source code 302, comprising computer executable instructions in a programming language. The source code 302 may include one or more functions, including bar( ) 304, as shown, which is configured to make a call 306 to another function foo( ) 308. A compilation 309 of the function bar( ) may cause a compiler to call another function foo( ). However, as shown in a binary file 310, a function such as foo( ) may be associated with multiple implementations (e.g., foo_f1( ) 318A, foo_f2( ) 318B, foo_default( ) 318C). Thus, when the source code 302 is compiled, a computing system (e.g., source computing system 100A/202) may generate multiple versions of foo( ). Each version of foo( ) may require different CPU-specific features in order to execute. For example, foo_f1( ) 318A requires CPU-specific features F1 to execute, foo_f2( ) 318B requires CPU-specific features F2 to execute, whereas foo_default( ) 318C may not require any specific CPU-specific feature to execute. In some embodiments, each implementation may deliver a different level of quality. For example, while foo_default( ) 318C may not require any specific CPU-specific feature to execute, the implementation of foo_default( ) 318C may deliver the lowest quality among the different versions of foo( ). As shown in the binary file 310, a resolver 316 may render an implementation decision on which version of the function to select for execution, depending on the features provided by the computing system (e.g., CPU-specific features).

Thus, FIG. 3 also shows three computing systems (System A 320A, System B 320B, System C 320C) each with CPUs (e.g., CPU 322A-322C) providing distinct sets of CPU-specific features. For example, the CPU 322A of System A 320A provides CPU-specific features 324A of F1, x, and y. When the binary file 310 of the application is executed in system A 320A from RAM 326A, the resolver 316 patches the call site 330A in bar( ) 328A with address of foo_f1( ) 332A. The CPU 322B of System B 320B provides CPU-specific features 324B of F2, x, and y. When the binary file 310 of the application is executed in system B 320B from RAM 326B, the resolver 316 patches the call site 330B in bar( ) 328B with address of foo_f2( ) 332B. The CPU 322C of System C 320C provides CPU-specific features 324C of x, y, and z. When the binary file 310 of the application is executed in system C 320C from RAM 326C, the resolver 316 patches the call site 330C in bar( ) 328C with address of foo_default( ) 332C.

Figure 4:
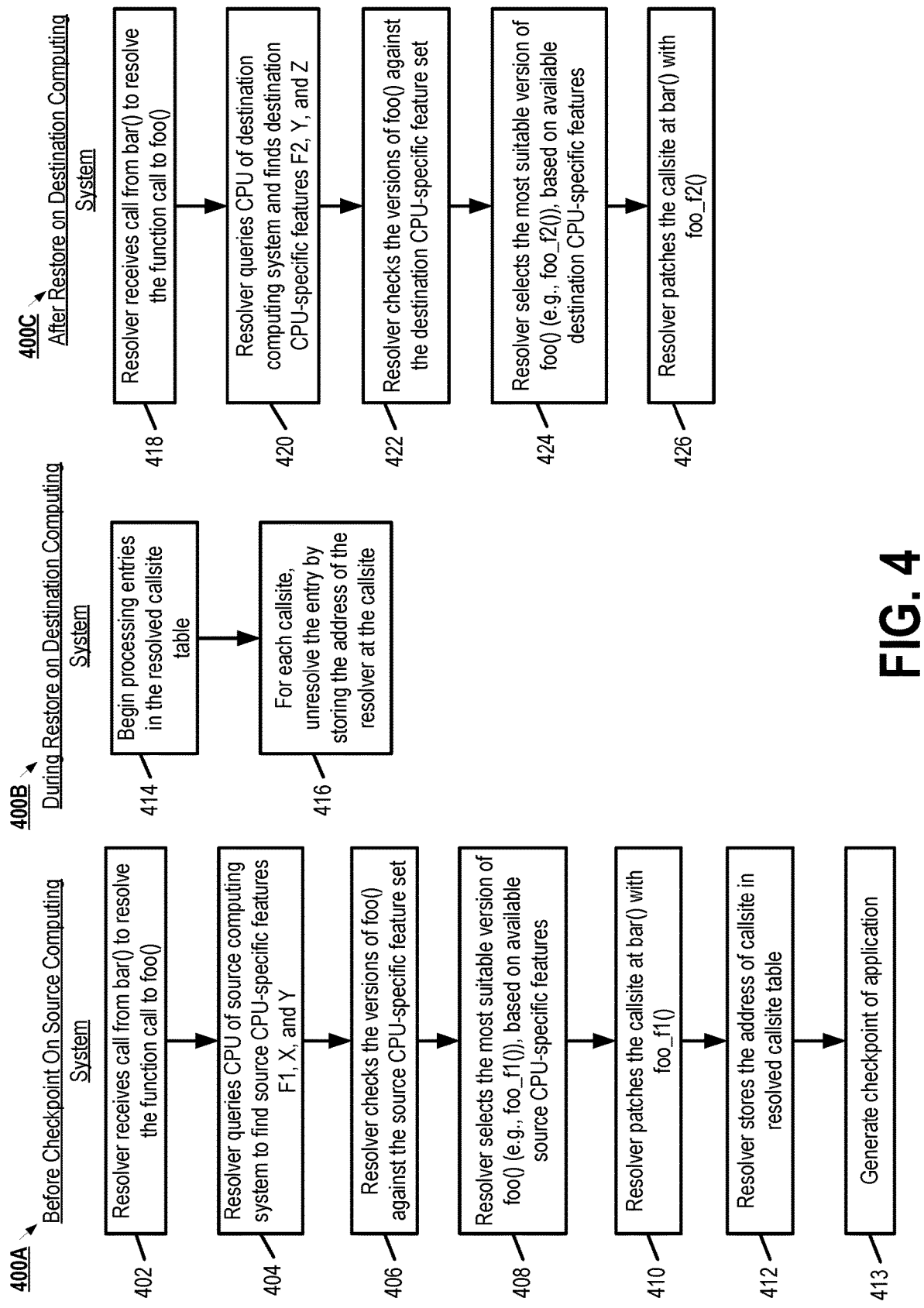
FIG. 4 shows process flow diagrams illustrating example process performed before a checkpoint of an application, during restoration of the application, and after restoration of the application, according to an example embodiment of the present disclosure.

FIG. 4 shows process flow diagrams illustrating example process performed before a checkpoint of an application (process 400A), during restoration of the application (process 400B), and after restoration of the application (process 400C), according to an example embodiment of the present disclosure.

Process 400A is performed by a source computing system (e.g., source processor 106A of source computing system 100A/202) before a checkpoint (e.g., a snapshot of an application at run-time) is taken on System A. Process 400A may occur during execution of an application) on source computing system 100A/202. The source code 302/120A of the application 204/118A may include a function (e.g., bar( ) 304) calling another function (foo( ) 308) with one or more implementations. For purpose of demonstration, processes 400A-400C involve an application in which the function bar( ) calls function foo( ) having multiple implementations. Process 400A may thus begin with a resolver (e.g., source resolver 102A, resolver( ) 316) receiving a call from the function bar( ) to resolve (e.g., select an implementation for) the function foo( ) (block 402).

The resolver 102A/316 may query CPU features of source computing system 100A/202 to identify (e.g., by retrieving a list of CPU-specific features) features F1, X, and Y (block 404). For example CPU 108A of the source computing system 100A/202 may be designed and/or preconfigured to provide such features (e.g., set of source CPU-specific features 110A), such that programs and applications that can run on source computing system 100A/202 is restricted to those that are compatible with those features. As previously discussed, the set of features identified from querying the CPU of the source computing system 100A/202 (source CPU-specific features) may not necessarily be the same as the CPU-specific features of other systems. In some embodiments, the source computing system 100A/202 (e.g., via its resolver) may query and retrieve features from other components of the computing system, in addition to, or alternatively to, the CPU. In such embodiments, the set of features associated with the source computing system 100A/202 (whether CPU-specific features or other hardware and/or middleware features) may not necessarily be the same as the set of features of other computing systems, and the set may similarly dictate whether an application or implementation of a function of an application is compatible or not.

At block 406, the resolver may check different implementations of the function against the feature set of the source computing system 100A/202. For example, resolver 316/102A may use the binary file 310 of foo( ) to identify versions foo_f1( ) 318A, foo_f2( ) 318B, and foo_default( ) 318C, and may determine that foo_f1( ) 318A requires feature F1 to execute, foo_f2( ) 318B requires feature F2 to execute, and foo_default( ) 318C does not require any particular CPU-specific features to execute. Based on available CPU-specific features provided by the CPU of the source computing system 100A/202 (e.g., the source CPU-specific features found to be F1, X, and Y), the resolver 316/102A may select the most suitable version of foo( ) (block 408). In the example described, the most suitable version of foo( ) may be foo_f1( ) 318A, since foo_f1( ) requires feature F1 to execute, and the CPU of the source computing system 100A/202 provides feature F1. In some embodiments, selecting the most suitable version may mean that the selected version of the function is able to deliver an implementation of the function on the computing system (e.g., source computing system 100A/202) that is of the highest quality compared to other implementations of the function that the computing system can deliver. For example, since the version foo_default( ) 318C does not require any specific features for its execution, the source computing system 100A/202 would also be able to execute foo_default( ). However, if the implementation of foo_default( ) 318C is of a lower quality than foo_f1( ) 318A, selecting the most suitable version of foo( ) based on the available features of source computing system 100A/202 may mean selecting foo_f1( ) 318A.

After the selection, the resolver may patch the callsite at bar( ) with the selected version of the function, foo_f1( ) (block 410). The patching may cause an execution of the function bar( ) 304 to cause foo( ) 308 to be executed using the version foo_f1( ) 318A. Furthermore, the resolver may store the address of the callsite in a resolved callsite table to indicate the implementation decision 124A is resolved (block 412). For example, resolver 316 may cause a resolved callsite table 112A associated with source computing system 100A/202 to indicate callsite in bar( ) as resolved based on the implementation decision of selecting foo_f1( ) as the version of foo( ) to execute.

At block 413, a checkpoint of the application may be taken. The checkpoint may capture a snapshot of the application at runtime. The snapshot may include details about the various implementation possibilities of functions of the application, as well as the implementation decision undertaken (e.g., via process 400A), to allow another system to restore the application at a same or different implementation decision (e.g., using processes 400B or 400C). For example, the checkpoint may include the resolved callsite table associated with the application indicating resolved states for the callsite for function foo( ).

Process 400B is performed by the destination computing system 100B/218 (e.g., destination processor 106B of destination computing system 100B) during a restoration of the application on the destination computing system 100B/218. Process 400B may occur after the destination computing system 100B/218 receives the checkpoint (e.g., checkpoint 130/206) from the source computing system 100A/202.

Process 400B may begin with the destination computing system 100B/218 processing entries in the resolved callsite table (block 414). The resolved callsite table may be received through, or may be accessed from, the checkpoint 130/206 of the application received from the source computing system 100A/202. As discussed previously, a resolved callsite table may store addresses of call sites corresponding to functions of an application. The resolved callsite table (e.g., resolved callsite table 112A) may indicate that one or more functions of an application are resolved, via addresses of the selected implementations of the one or more functions. For example, the resolved callsite table received by the destination computing system 100B/218 may indicate that the function foo( ) is resolved by storing the address of the implementation foo_f1( ) at the callsite in bar( ).

For each entry in the received resolved callsite table, the destination computing system 100B/218 may unresolve the callsite by storing the address of the resolver at the callsite (block 416). For example, the destination computing system 100B/218 may indicate that the implementation decision 124B for the function foo( ) is unresolved by storing the address of the resolver (e.g., resolver( ) 316) in the callsite for the function foo( ). By rendering the implementation decision as unresolved, the destination computing system 100B/218 would be prevented from executing the function foo( ) using an implementation that the destination computing system 100B/218 may not necessarily be able to support. Furthermore, unresolving the callsites may provide portability to an application by making it adapted to and compatible with other computing systems such as the destination computing system 100B/218.

Process 400C is performed by the destination computing system 100B/218 (e.g., destination processor 106B of destination computing system 100B/218) after a restoration of the application on the destination computing system 100B/218. Process 400C may begin with a resolver of the destination computing system 100B/218 (e.g., destination resolver 102B, resolver( ) 316) receiving a call from bar( ) to resolve (e.g., select an implementation for) the function call to foo( ) (block 418). The resolver 102B/316 may query CPU features of system B to identify (e.g., by retrieving a list of) features F2, Y, and Z (block 420). For example CPU 108B of the destination computing system 100B/218 may be designed and/or preconfigured to provide such features (e.g., set of destination CPU-specific features 110B), such that programs and applications that can run on the destination computing system 100B/218 is restricted to those that are compatible with those features. As previously discussed, the set of features identified from querying the CPU of the destination computing system 100B/218 (e.g., the set of destination CPU-specific features 110B) may not necessarily be the same as the CPU-specific features of other systems (such as the set of source CPU-specific features of source computing system 100A/202). In some embodiments, destination computing system 100B/218 (e.g., via destination resolver 102B) may query and retrieve features from other components of the computing system, in addition to, or alternatively to, the CPU. In such embodiments, the set of features associated with the destination computing system 100B/218 (whether CPU-specific features or other hardware and/or middleware features) may not necessarily be the same as the set of features of other computing systems, and the set may similarly dictate whether an application or implementation of a function of an application is compatible or not.

At block 422, the destination computing system 100B/218 (via destination resolver 102B) may check the versions of foo( ) against the feature set of the destination computing system 100B/218. For example, resolver 316/102B may use the binary file 310 of foo( ) to identify versions foo_f1( ) 318A, foo_f2( ) 318B, and foo_default( ) 318C, and may determine that foo_f1( ) 318A requires feature F1 to execute, foo_f2( ) 318B requires feature F2 to execute, and foo_default( ) 318C does not require any specific features to execute. Based on available features of the destination computing system 100B/218 (e.g., the CPU-specific features found to be F2, Y, and Z), the resolver 316/102B may select the most suitable version of foo( ) (block 424). In the example described, the most suitable version of foo( ) may be foo_f2( ) 318B, since foo_f2( ) requires feature F2 to execute, and the CPU of the destination computing system 100B/218 provides feature F2. In some embodiments, selecting the most suitable version may mean that the selected version of the function is able to deliver an implementation of the function on the computing system (e.g., the destination computing system 100B/218) that is of the highest quality compared to other implementations of the function that the computing system can deliver. For example, since the version foo_default( ) 318C does not require any specific features for its execution, the destination computing system 100B/218 would also be able to implement foo_default( ). However, if the implementation of foo_default( ) 318C is of a lower quality than foo_f2( ) 318B, selecting the most suitable version of foo( ) based on the available features of the destination computing system 100B/218 may mean selecting foo_f2( ) 318B.

After the selection, the resolver may patch the callsite at bar( ) with the selected version of the function, foo_f2( ) (block 426). The patching may cause any execution of the function bar( ) 304 to cause foo( ) 308 to be executed using the version foo_f2( ) 318B. Thus, the same application can be adapted to run at the best performance possible in the source computing system 100A/202, by relying on an implementation of a function that is compatible with CPU-specific features of the source computing system 100A/202 (e.g., feature F1), and also run at the best performance possible for the destination computing system 100B/218, by relying on an implementation of a function that is compatible with CPU-specific features of the destination computing system 100B/218 (e.g., feature F2).

Figure 5:
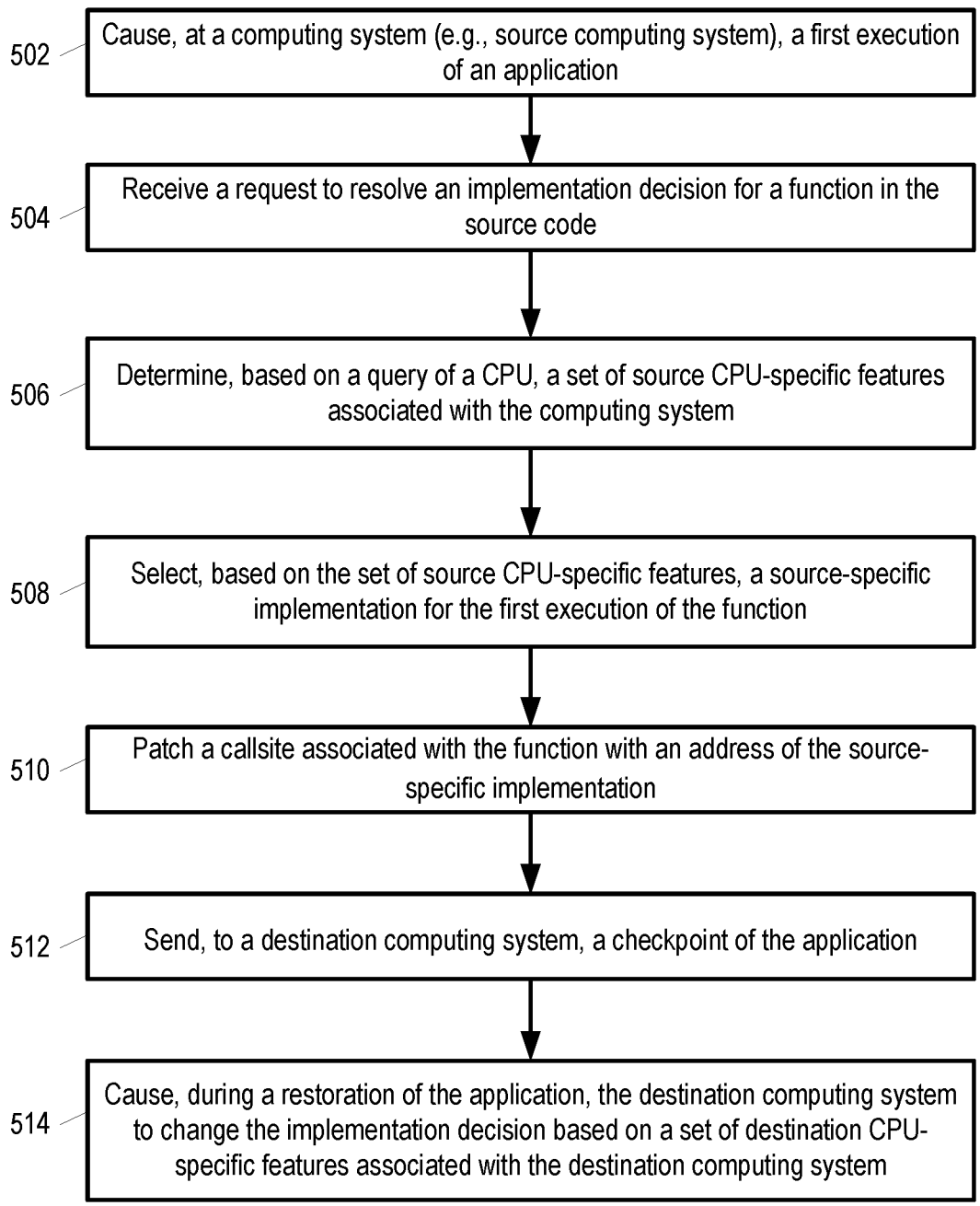
FIG. 5 illustrates a flowchart of an example process performed by a source computing system for improving portability of checkpoints of an application using central processing unit (CPU)-specific functions, according to an example embodiment of the present disclosure.

FIG. 5 illustrates a flowchart of an example process 500 performed by a source computing system 100A/202 for improving portability of checkpoints of an application using central processing unit (CPU)-specific functions, according to an example embodiment of the present disclosure. The source computing system 100A/202 may comprise a computing system involved with the compilation of an application and selecting implementations for one or more functions of the application, prior to generating a checkpoint (e.g., checkpoint 130/206) for the application for use in other systems. Process 500 may be performed by a processor of the source computing system (e.g., source processor 106A) using computer-executable instructions stored in a memory (e.g., source memory 104A).

Process 500 may begin with the source computing system 100A/202 causing an execution of the application (block 502). The execution at block 502 by the source computing system 100A/202 may be distinguishable from an execution of the application by another system (e.g., destination computing system 100B/218), and thus the execution at block 502 may be referred to as first execution for simplicity. The first execution may be based on a compilation of a source code (e.g., source code 120A/302) associated with the application. Furthermore, the application (e.g., application 118A/204) may include one or more functions having multiple versions for implementation. Thus, at block 504, the source computing system 100A/202 may receive a request to resolve an implementation decision for a function in the source code having the multiple implementation. For example, during the first execution, the source processor 106A may determine a callsite associated with the function leads to resolver( ) 316, and may thus be prompted to resolve the function. The source computing system 100A/202 may have several versions of the function to select from (e.g., foo_f1( ) 318A, foo_f2( ) 318B, foo_default( ) 318C), with each version leading to a different implementation of the function. Moreover, each version may require a different features (e.g., CPU-specific features) from the computing system, and may range in quality of implementation. For example, implementations of versions with little to no requirement of a computing system's features (e.g., foo_default( ) 318C), may be lower quality implementations of the function (e.g., foo( )).

At block 506, the source computing system 100A/202 may thus determine a set of features associated with the source computing system 100A/202 e.g., to decide which version of the function to select. The set of features determined by the source computing system 100A/202 may be based on a query of its CPU 108A and/or other hardware or middleware. Since each computing system may have a different set of features, the set of features determined by the source computing system 100A/202 may be referred to as set of source CPU-specific features 110A for simplicity.

At block 508, the source computing system 100A/202 may select, based on the set of source CPU-specific features, a source-specific implementation for the first execution of the function. The source-specific implementation may be based on a version of the function for which the source computing system is able to provide (e.g., from the set of source CPU-specific features 110A) any feature that may be required by that version. Furthermore, if more than one version may be satisfied by the set of source CPU-specific features 110A provided by the source computing system 100A/202, the source computing system 100A/202 may select the version that delivers the highest quality of implementation.

At block 510, the source computing system 100A/202 may patch the callsite with an address of the implementation associated with the function. For example, the source computing system 100A/202 may replace the address of the resolver( ) function with the address associated with the selected implementation (source-specific implementation).

At block 512, the source computing system 100A/202 may send, to a destination computing system (e.g., destination computing system 100B/218), a checkpoint of the application. The checkpoint may capture a snapshot of the application at runtime. The snapshot may include details about the various implementation possibilities of functions of the application, as well as the implementation decision undertaken (e.g., selecting the source-specific implementation for the first execution of the function at block 508). Furthermore, the checkpoint may include sufficient information to allow the destination computing system 100B/218 to initiate a restoration of the application using the same or different implementation decision (e.g., using process 600 described in FIG. 6). For example, the checkpoint may include the resolved callsite table associated with the application indicating resolved callsites for the function As will be discussed below, in relation to FIG. 6, the destination computing system 100B/218 may not share the same set of features as the source computing system, and thus the implementation selected by the source computing system may not be compatible with the destination computing system.

Thus, the source computing system 100A/202 may cause the destination computing system 100B/218 to, during a restoration of the application by the destination computing system 100B/218, change the implementation decision based on a set of destination CPU-specific features associated with the destination computing system 100B/218 (block 514). For example, the destination computing system 100B/218 may be able to use the checkpoint provided by the source computing system 100A/202 to re-patch the callsites to reconfigure the implementation.

Figure 6:
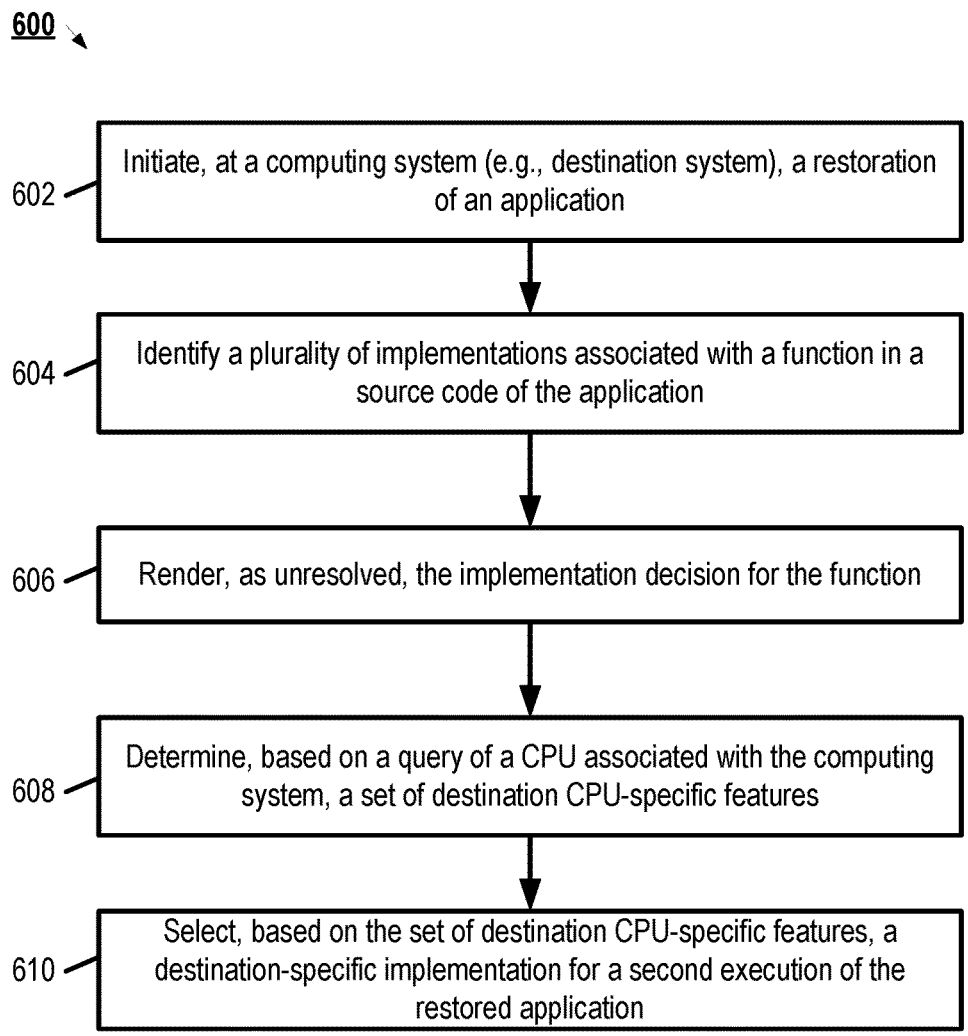
FIG. 6 illustrates a flowchart a flowchart of an example process performed by a destination computing system for improving portability of checkpoints of an application using central processing unit (CPU)-specific functions, according to an example embodiment of the present disclosure.

FIG. 6 illustrates a flowchart of an example process 600 performed by a computing system (e.g., destination computing system 100B/218) for improving portability of checkpoints of an application using central processing unit (CPU)-specific functions, according to an example embodiment of the present disclosure. The computing system (e.g., destination computing system 100B/218) may be involved with receiving a checkpoint 130/206 of an application, restoring the application, and selecting a new implementation (e.g., destination-specific implementation 126B) for one or more functions of the application. Process 600 may be performed by a processor of the computing system 100B/218 (e.g., destination processor 106B of destination computing system 100B/218) using computer-executable instructions stored in a memory (e.g., destination memory 104B). For ease of explanation, destination computing system 100B/218 may be used to refer to the computing system performing process 600. However, the computing system performing process 600 may not be restricted to the destination computing system 100B/218, as any computing system may be rendered as a destination computing system (e.g., after receiving a checkpoint of the application) to perform process 600.

Process 600 may begin after the destination computing system 100B/218 has received the checkpoint of the application to allow it to restore the application, e.g., at blocks 512 and block 514 of process 500. At block 602, a restoration of the application may be initiated at the destination computing system 100B/218. For example, the destination computing system 100B/218 may use the checkpoint to access the resolved callsite table associated with callsites of functions of the application that have multiple implementations.

At block 604, the destination computing system 100B/218 may identify a plurality of implementations associated with the function in a source code of the application. For example, the destination computing system 100B/218 may access and/or identify, within a resolved callsite table associated with the application, a plurality of addresses of a plurality of respective call sites associated with a plurality of respective functions included in the application. The destination computing system 100B/218 may then identify, among the plurality of respective functions included in the application, the function as having the multiple implementations.

At block 606, the destination computing system 100B/218 may render, as unresolved, the implementation decision for the function. For example, for each address of each respective call site stored in the resolved callsite table, the destination computing system 100B/218 may unresolve the respective function by removing the resolved state for the respective function. In some embodiments, unresolving may involve patching the callsite with an address to the resolve( ) function.

At block 608, the destination computing system 100B/218 may determine, based on a query of a CPU associated with the destination computing system 100B/218, a set of destination CPU-specific features. As previously discussed, the set of destination CPU-specific features is different from the set of source CPU-specific features.

At block 610, the destination computing system 100B/218 may select, based on the set of destination CPU-specific features, a destination-specific implementation for a second execution of the restored application. In some embodiments, following the selection, the destination computing system 100B/218 may patch a call site associated with the function with the destination-specific implementation. Thus, the implementation decision 124B for that function may be resolved, since the call site associated with the function would point to an address for the destination-specific implementation, instead of to the resolver.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method for improving portability of checkpoints of an application, the method comprising:
   initiating, by a computing system, a restoration of an application previously running on a source computing system, wherein the application includes a function;
   identifying, by the computing system, based on the function, a plurality of implementations associated with the function;
   rendering, as unresolved, an implementation decision of the function, wherein the implementation decision is associated with selecting an implementation among the plurality of implementations;
   determining, by the computing system, based on a query of a central processing unit associated with the computing system, a destination set of CPU-specific features associated with the computing system; and
   selecting, based on the set of destination CPU-specific features, a destination-specific implementation of the plurality of implementations for the function.

2. The method of claim 1, wherein the identifying the plurality of implementations associated with the function comprises:
   identifying, within a resolved callsite table associated with the application, a plurality of addresses of a plurality of respective call sites associated with a plurality of respective functions included in the application; and
   identifying, among the plurality of respective functions included in the application, the function as having the plurality of implementations.

3. The method of claim 2, wherein, prior to the rendering, each of the plurality of addresses stored within the resolved callsite table is marked as having a resolved state for the respective plurality of functions.

4. The method of claim 3, wherein rendering, as unresolved, the implementation decision of the function further comprises:
   for each address of each respective call site stored in the resolved callsite table, unresolving the callsite by removing the resolved state for the respective function call.

5. The method of claim 1, wherein, prior to the rendering, the source computing system resolved the function to be implemented under a source-specific implementation.

6. The method of claim 5, wherein the source computing system resolved the function to be implemented under a source-specific implementation based on a set of source CPU-specific features associated with the source computing system, wherein the set of destination CPU-specific features is different from the set of source CPU-specific features.

7. The method of claim 1, further comprising:
patching, by the computing system, a call site associated with the function with the destination-specific implementation.

8. The method of claim 1, further comprising:
rendering, as resolved, and based on the selection of the destination-specific implementation, the implementation decision of the function.

9. The method of claim 1, further comprising, prior to initiating the restoration, receiving, by the computing system, a checkpoint of the application from the source computing system.

10. A method for improving portability of checkpoints of an application, the method comprising:
receiving, by a computing system, a request to resolve a function during a first execution of the function, wherein the function is associated with a plurality of implementations;
determining based on a query of a central processing unit (CPU) associated with the computing system, a set of source CPU-specific features associated with the computing system;
selecting, based on the set of source CPU-specific features, a source-specific implementation of the plurality of implementations for the first execution of the function;
patching a callsite associated with the function with an address of the source-specific implementation; and
causing, based on a set of destination CPU-specific features associated with a destination computing system, a re-resolution of the function during a restoration of a checkpoint of the application on the destination computing system.

11. The method of claim 10, wherein the re-resolution causes a selection of a destination-specific implementation of the plurality of implementation.

12. The method of claim 10, wherein patching the callsite with the address of the source-specific implementation renders a resolved callsite table.

13. The method of claim 12, wherein patching the callsite with the address of the source-specific implementation renders a resolved state for the function, wherein the resolved callsite table stores a plurality of addresses of a plurality of respective call sites associated with a plurality of respective functions.

14. The method of claim 13, wherein the re-resolution of the function comprises:
for one or more addresses corresponding to one or more respective call sites stored in the resolved callsite table, unresolving the respective one or more functions by removing the resolved states for the one or more respective functions.

15. A system for improving portability of checkpoints of an application, the system comprising:
a source computing system comprising:
a source memory, and
a source processor;
wherein the source memory stores instructions that, when executed by the source processor, causes the source computing system to:
cause a first execution of an application, wherein the application includes a function associated with a plurality of implementations;
receive a request to resolve an implementation decision for the function during the first execution, wherein resolving the implementation decision comprises selecting an implementation among the plurality of implementations;
determine, based on a query of a central processing unit (CPU) associated with the source computing system, a set of source CPU-specific features associated with the source computing system;
select, based on the set of source CPU-specific features, a source-specific implementation of the plurality of implementations for the first execution of the function;
patch, by rendering a resolved callsite table, a call site associated with the function with an address of the source-specific implementation;
send, to a destination computing system, a checkpoint of the application, wherein the checkpoint includes the resolved callsite table; and
cause, during a restoration of the application, based on a set of destination CPU-specific features associated with the destination computing system, the destination computing system to change the implementation decision.

16. The system of claim 15, further comprising:
the destination computing system comprising a destination memory and a destination processor;
wherein the destination memory stores instructions that, when executed by the destination processor, causes the destination computing system to:
initiate a restoration of the application;
identify, by tracing the address of the call site associated with the function, the plurality of implementations associated with the function;
render, as unresolved, the implementation decision for the function;
determine based on a query of a central processing unit (CPU) associated with the destination computing system, the set of destination CPU-specific features associated with the destination computing system; and
select, based on the set of destination CPU-specific features, a destination-specific implementation of the plurality of implementations for a second execution of the restored application.

17. The system of claim 16, wherein the destination memory stores instructions that, when executed by the destination processor, causes the destination computing system to identify the plurality of implementations associated with the function by:
identifying, within the resolved callsite table associated with the application, a plurality of addresses of a plurality of respective call sites associated with a plurality of respective functions of the application; and
identifying, among the plurality of respective functions of the application, the function as having the plurality of implementations.

18. The system of claim 17, wherein, prior to rendering the implementation decision as unresolved, each of the plurality of addresses stored within the resolved callsite table is marked as having a resolved state for the respective plurality of functions.

19. The system of claim 18, wherein the destination memory stores instructions that, when executed by the destination processor, causes the destination computing system to render, as unresolved, the implementation decision of the function by:

for each address of each respective call site stored in the resolved callsite table, unresolving the respective function by removing the resolved state for the respective function.

20. The system of claim 19, wherein the destination memory stores instructions that, when executed by the destination processor, further causes the destination system to:

patch the call site associated with the function with an address of the destination-specific implementation.

* * * * *